United States Patent
Linhart et al.

(10) Patent No.: US 8,551,272 B2
(45) Date of Patent: Oct. 8, 2013

(54) METHOD FOR PRODUCING A CERAMIC FILTER BODY

(75) Inventors: Jochen Linhart, Schwikheim (DE); Andreas Franz, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 663 days.

(21) Appl. No.: 12/515,228

(22) PCT Filed: Nov. 26, 2007

(86) PCT No.: PCT/EP2007/062816
§ 371 (c)(1),
(2), (4) Date: Dec. 29, 2009

(87) PCT Pub. No.: WO2008/065077
PCT Pub. Date: Jun. 5, 2008

(65) Prior Publication Data
US 2010/0089518 A1    Apr. 15, 2010

(30) Foreign Application Priority Data
Nov. 27, 2006   (DE) .......................... 10 2006 056 195

(51) Int. Cl.
C03B 29/00  (2006.01)
C04B 33/34  (2006.01)
B31C 1/00   (2006.01)
B01D 46/10  (2006.01)
B01D 39/00  (2006.01)
B01D 39/14  (2006.01)

(52) U.S. Cl.
USPC ................... 156/89.11; 156/89.22; 156/184; 55/520; 55/521; 55/523; 55/498; 55/524

(58) Field of Classification Search
USPC .............. 156/89.22, 89.11, 184; 55/520, 521, 55/523, 524, 498
See application file for complete search history.

(56) References Cited

U.S. PATENT DOCUMENTS 2,599,604 A  *  6/1952  Bauer et al. ................ 210/494.1
2,762,724 A  *  9/1956  Bany ............................... 428/68
(Continued)

FOREIGN PATENT DOCUMENTS

WO   WO03/103940 A   12/2003
WO   WO2004/063539 A  7/2004
(Continued)

OTHER PUBLICATIONS

International search report on international application PCT/EP2007/062816.

Primary Examiner — Philip Tucker
Assistant Examiner — Alex Efta
(74) Attorney, Agent, or Firm — James Hasselbeck

(57) ABSTRACT

The invention concerns a method for producing a ceramic filter body (1) for filtering an exhaust gas stream (2) of a diesel engine. The filter body (1) has planar and porous filter sections (3) that are designed to be passed by the exhaust gas flow (2) in a direction transverse to the face of the filter sections (3). A planar permeable fiber web (4, 4'), in particular of filter paper, is first impregnated with finely ground ceramic material (6) only across sections under formation of a non-impregnated section (12). The only partially ceramic-impregnated fiber web (4, 4') is subsequently brought into the shape of a blank of the filter body (1) in such a way that the impregnated areas of the fiber web (4, 4') assume the shape of the filter body (1). The fiber web (4, 4') impregnated section-wise with the ceramic material (6) and shaped is subsequently sintered under heat in such a way that the fibers (5) of the fiber web are burned off and the ceramic material (6) is sintered under formation of the filter body (1) with filter sections (3) that are continuously porous and gas-permeable between their two faces (7, 8).

14 Claims, 2 Drawing Sheets

(56) References Cited

U.S. PATENT DOCUMENTS

| | | | |
|---|---|---|---|
| 2,875,724 A * | 3/1959 | Joa | 118/60 |
| 5,066,432 A * | 11/1991 | Gabathuler et al. | 264/28 |
| 2003/0072694 A1* | 4/2003 | Hodgson et al. | 422/180 |
| 2004/0231307 A1 | 11/2004 | Wood | |
| 2005/0249914 A1 | 11/2005 | Scheibel | |
| 2007/0186911 A1* | 8/2007 | Gerlach et al. | 123/556 |

FOREIGN PATENT DOCUMENTS

| WO | WO2006/005668 A | 1/2006 |
|---|---|---|
| WO | WO 2006005668 A1 * | 1/2006 |

* cited by examiner

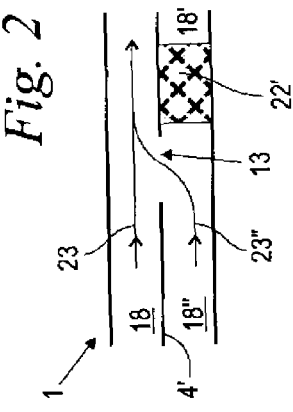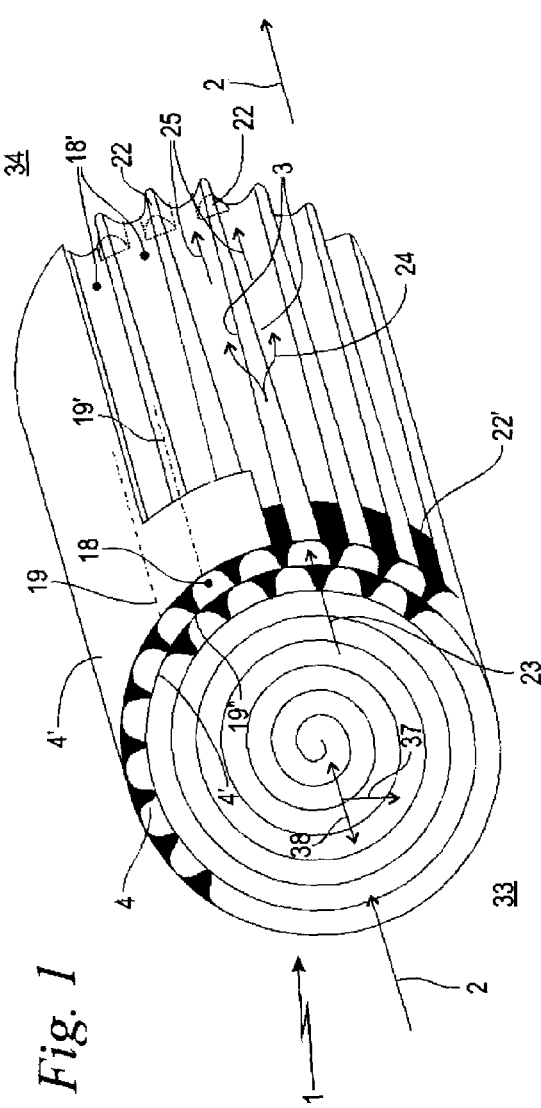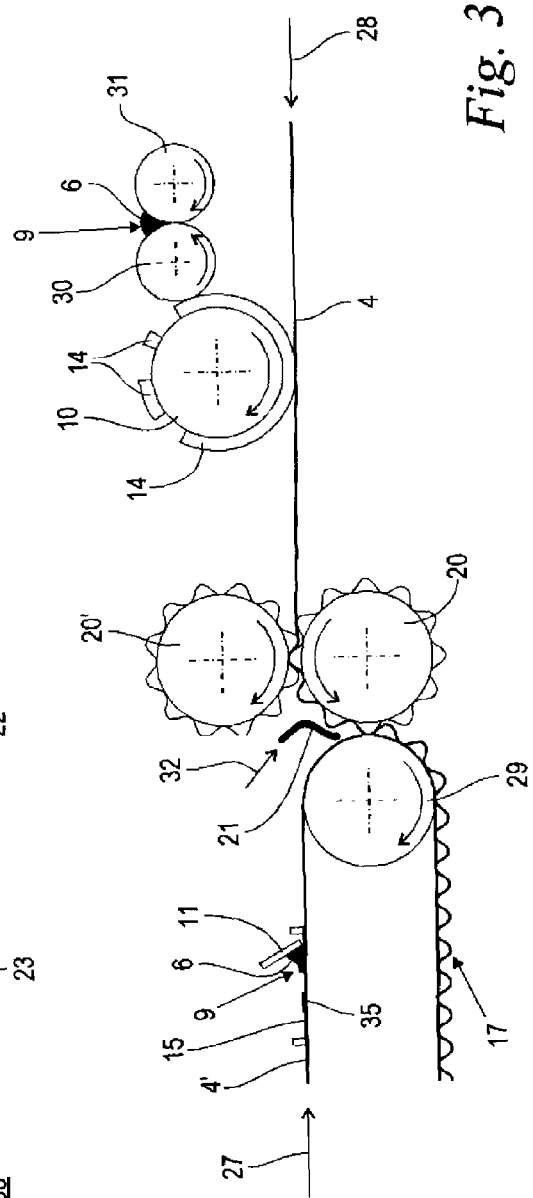

METHOD FOR PRODUCING A CERAMIC FILTER BODY

CROSS REFERENCE TO RELATED APPLICATIONS

This application is US national stage entry of international patent application PCT/EP2007/062816, filed Nov. 26, 2007 designating the United States of America, and published in German on Jun. 5, 2008 as WO 2008/065077 A1, the entire disclosure of which is incorporated herein by reference. Priority is claimed based on Federal Republic of Germany patent application DE 10 2006 056 195.3 filed Nov. 27, 2006, the entire disclosure of which is incorporated herein by reference.

TECHNICAL FIELD

The invention concerns a method for producing a ceramic filter body for filtration of an exhaust gas flow of a diesel engine wherein the filter body has planar and porous filter sections that are provided for flow-through of the exhaust gas flow transverse to the face of the filter sections.

STATE OF THE ART

DE 35 01 182 A1 discloses an exhaust gas filter for diesel engines. The ceramic filter bodies disclosed therein have layered, planar and porous filter sections between which gas passages are formed. The gas passages are closed off alternatingly. An exhaust gas flow that flows on one end into the gas passages that are open at this end is forced by the closure plugs to flow through the porous filter sections in a direction transverse to their faces. The exhaust gas passages on the opposite side are open in the outflow direction and release the filtered exhaust gas flow.

No further information is provided in regard to the manufacture of the ceramic filter bodies disclosed therein. Geometrically comparable bodies as they are known, for example, in connection with exhaust gas catalysts are produced by extrusion. This requires a high tool expenditure for shaping. The degrees of freedom in regard to shaping of the filter bodies and in particular the filter sections as well as the gas passages are limited due to the extrusion process. A configuration of the diesel particle filter that is optimized with regard to flow is difficult.

WO 2006/005668 A1 shows a ceramic exhaust gas filter for internal combustion engines whose filter body is formed of a ceramic-impregnated paper. One flat and one undulated impregnated paper web each are layered to form a semi-finished product under formation of gas passages and are rolled to a coil form. The undulations of the undulated paper web have across their entire length a constant shape so that the gas passages along their length extension have a constant cross-section.

It is an object of the invention to provide a method for producing a ceramic filter body of the aforementioned kind which, with minimal manufacturing expenditure, enables an optimal shaping.

This object is solved by a method with the features of claim 1.

SUMMARY OF THE INVENTION

According to the invention the following method steps are provided: a planar permeable fiber web, in particular of filter paper, is first impregnated with finely ground ceramic material under formation of at least one non-impregnated section.

The fiber web that is only partially ceramic-impregnated is subsequently transformed into the shape of a blank of the filter body in such a way that the impregnated areas of the fiber web assume the shape of the filter body. The fiber web that is impregnated with ceramic material and shaped is subsequently sintered under heat such that the fibers of the fiber web are burned off and the ceramic material sinters under formation of the filter body with filter sections that are continuously porous and gas permeable between the two faces.

The fiber web serves initially as a support material for the still soft, not yet sintered ceramic material. The impregnated fiber web can be realized with minimal tool expenditure into almost any shape so that flow-optimized diesel particle filters can be formed almost without any limitation in regard to the geometric shape. A filter blank that has been shaped in this way can maintain its shape without any additional support during preparation and performance of sintering. The heat applied for sintering leads on the one hand to sintering of the ceramic material to a solid body. On the other hand, the fibers of the fiber web are burned at the same time so that the desired porosity of the filter sections is realized. Fibers that are optionally exposed at both faces ensure that the porosity is provided also at the faces so that gas permeability transverse to the face of the filter sections is ensured. The partial impregnation forming non-impregnated sections by stamping or the like and/or by sections that are not impregnated or are excluded from impregnation has the result that complex geometric shapes can be produced also. Non-impregnated sections of the fiber webs burn upon sintering almost without leaving any residue and leave behind a monolithic ceramic structure in the form of the applied impregnation. In this way the formation of openings, curved edges or the like is possible. The method according to the invention is simple, cost-efficient and provides almost unlimited possibilities of shaping.

The impregnation of the fiber web with the ceramic emulsion is realized preferably by applying pressure and in particular by means of a roller or a doctor blade. In this way, a uniform penetration of the ceramic particles into the interior of the fiber web is ensured.

Moreover, there are possibilities of selective impregnation made available: for formation of a non-impregnated section a roller can be advantageously provided with a surface structure with which roller a rolling of the ceramic material into the fiber web is realized only by means of the raised portions of the surface structuring which raised portions are predetermined with regard to shape. Alternatively, it can be expedient that the formation of the non-impregnated sections is realized by a partially covered screen between the fiber webs and the doctor blade. Similar to screen printing, the ceramic mass is selectively applied. Exact boundary contours between impregnated and non-impregnated sections can be achieved with minimal expenditure. Moreover, there is the possibility of applying selectively different ceramic materials to different areas of the fiber web.

Alternatively or in combination therewith, for forming the non-impregnated sections and in particular for forming an opening, a cutout is produced in the fiber web or the fiber web is trimmed. This can be utilized for precise shaping of the desired opening. For example, in combination with surface structuring of the roller that is matched in regard to shape or an appropriate covering of the screen, the ceramic material is applied only where impregnation of the fiber web is desired. In areas of the cutouts or the trimmed portions of the fiber web no ceramic material is rolled on or applied by doctor blade. Material consumption and tool soiling are minimized. It is also possible to impregnate the fiber web first across its entire surface area and to produce only subsequently the non-impregnated sections by stamping, trimming or the like.

In an advantageous embodiment, for forming a semi-finished product with gas passages two fiber webs are connected with one another along several contact lines wherein at least one fiber web is shaped three-dimensionally between two neighboring contact lines. This can be realized by several stacked fiber webs between which the contact lines are staggered relative to one another and that, after gluing, are stretched to a honeycomb-like shape. Advantageously, the first fiber web is produced with undulated structure and the second fiber web is produced to be flat wherein the two fiber webs, for formation of the gas passages, are connected to one another at wave peaks of the wave structure. The selected term of undulated shape or undulated structure comprises undulations with rounded, for example, sine-shaped cross-section, but also with angular, for example, triangular, rectangular, or trapezoidal cross-section. Any suitable, even irregular, undulated shape can be provided that shapes the gas passages by an upward and downward course of the cross-section. In this way, a two-layered semi-finished product is produced that is undulated on one side. It can be produced at high productivity as an endless material, can be cut to length, and wound or stacked to a filter body. The undulated structure enables multiple shapes. In addition to gas passages with constant cross-section also those with widening or tapering cross-section are possible.

In a preferred embodiment, the three-dimensional shaping of the at least one fiber web is realized with stabilizing heat action in particular by means of a heated undulated roller. This leads to a slight drying of the undulated layer in order to stabilize it in its predetermined shape.

As needed, it can be expedient to provide between two neighboring fiber webs at least one bead of ceramic material for forming a closure plug for the gas passages. For joining or pressing together the two neighboring fiber webs and for their contacting at the contact lines, the plastically deformable soft material of the ceramic bead is pressed tightly against the surface of the fiber web and ensures a reliable sealing action of the gas passages. Upon subsequent sintering the ceramic material of the bead sinters together with the ceramic impregnation of the fiber webs so that a monolithic shaped body results. After-processing by subsequent application of closure plugs is not required.

The semi-finished product is advantageously shaped in the wet state into the shape of the filter body, in particular by winding, then is subsequently dried, and finally sintered. The shaping in the wet state before drying avoids crack formation in the fiber material and the ceramic material. The applied shaping is stabilized by the subsequent drying process.

BRIEF DESCRIPTION OF THE DRAWINGS

One embodiment of the invention will be explained in the following with the aid of the drawing in more detail. It is shown in:

FIG. 1 in schematic perspective illustration a ceramic filter body that has been produced according to the present invention from ceramic-impregnated wound fiber webs;

FIG. 2 a schematic longitudinal section illustration of two neighboring gas passages with an intermediately positioned opening for unimpaired gas exchange;

FIG. 3 a schematic illustration of a roller and doctor blade device for impregnation of fiber webs with ceramic material as well as for shaping and joining to form a semi-finished product;

EMBODIMENT(S) OF THE INVENTION

Figure 4:
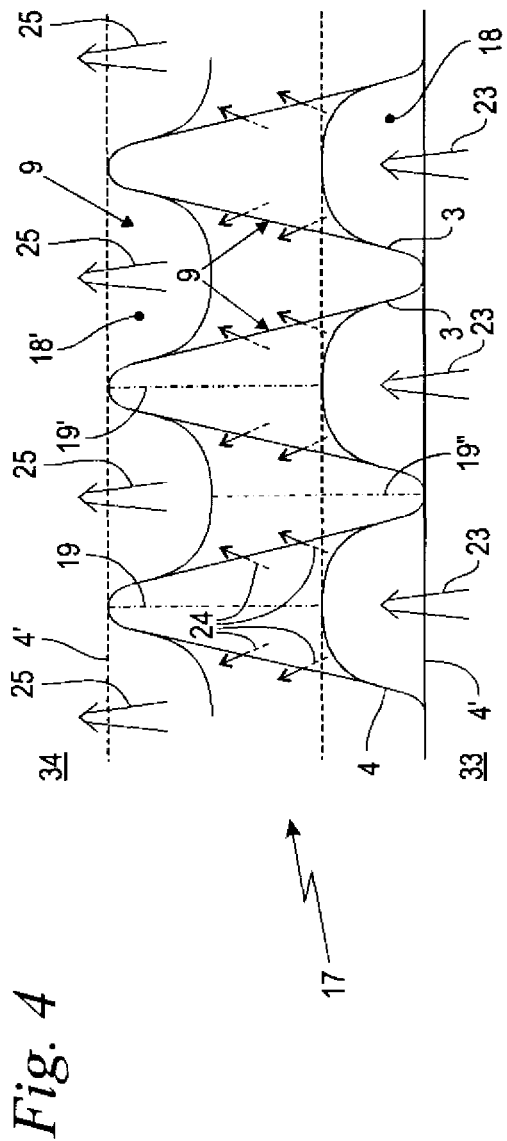
FIG. 4 an enlarged schematic illustration of the semi-finished product according to FIG. 3 with gas passages changing in cross-section and with details for connecting an undulated and a flat impregnated fiber web for forming the gas passages.

FIG. 1 shows in a schematic, partially sectioned, perspective illustration a ceramic filter body 1 in accordance with the invention. The filter body 1 is part of a diesel particle filter, not shown in detail, and is provided for filtering an exhaust gas flow 2 of a diesel engine. The filter body 1 is formed of ceramic-impregnated fiber webs 4, 4' that will be explained in more detail in connection with FIGS. 3 to 5. The fiber webs 4, 4' are joined in accordance with the illustration according to FIGS. 3 and 4 to a semi-finished product 17 that is wound to an approximately cylindrically embodied filter body 1. The winding action of the ceramic-impregnated fiber webs 4, 4' to a wound body produces a layering direction that is identical to a radial direction 37 of the cylindrical filter body 1. Alternatively, it can also be expedient to arrange several undulated fiber webs 4 or semi-finished products 17 (FIGS. 3 and 4) in a plane and to layer them like a stack.

It is provided that the exhaust gas flow 2 passes through the filter body 1 in the axial direction 38 of the filter body 1 from the intake side 33 to an outlet side 34. For this purpose, the first fiber web 4 is undulated while the second fiber web 4' is substantially flat. The selected form of the undulated shape comprises undulations with rounded, for example, sine-shaped cross-section, but also those with an angular, for example, triangular, rectangular, or trapezoidal cross-section. As a result of the stacked or wound structure, relative to a radial direction 37 of the filter body 1, alternatingly an undulated fiber web 4 and a flat fiber web 4' are layered on top one another. The fiber web 4 is connected to the second flat fiber web 4' along a plurality of approximately parallel extending contact lines 19, 19', 19". As a result of the undulated shape of the fiber web 4, the flat shape of the additional fiber web 4', and the wound structure, a plurality of at least approximately axis-parallel extending gas passages 18, 18' is formed with a height, measured in the radial direction 37, that is constant in the axial direction 38. In the circumferential direction of the filter body 1 alternatingly one gas passage 18 and one gas passage 18' are provided, respectively. The gas passages 18 are open toward the inlet side 33 and are closed off by means of closure plugs 22 in the opposite direction toward the outlet side 34. Relative to the circumferential direction between two gas passages 18 one gas passage 18' is provided, respectively, that is closed by a closure plug 22' toward the inlet side 33 and is open toward the outlet side 34. In operation, the exhaust gas flow 2 flows in accordance with arrow 23 axis-parallel into the gas passages 18 that are open at the inlet side 33. Sidewalls of the ceramic structure that are produced by the undulated fiber web 4 form planar and porous filter sections 3. The exhaust gas flow 2 that is retained at the closure plugs 22 is deflected in the circumferential direction in accordance with arrows 24 and flows through the porous ceramic filter sections 3 transversely to its surface area. In accordance with the arrows 24 the exhaust gas flow 2 passes through the filter sections 3 into the passages 18 that are open toward the outlet side 34 and exits in accordance with the arrows 25. Upon passing through the porous filter sections 3 the exhaust gas flow 2 is purified by removal of entrained soot particles or the like.

For certain applications it can be expedient to provide in the filter section that is formed by the flat fiber webs 4' openings 13 whose production will be explained infra. The schematic longitudinal section illustration according to FIG. 2 shows that such an opening 13 is arranged, for example, upstream of a closure plug 22'. The gas passage 18 at the intake side extends continuously past the closure plug 22'. The adjacently positioned adjoining passage structure is divided by the closure plug 22' into the gas passage 18' at the outlet side and the passage section 18" at the intake side. The exhaust gas flow 2 (FIG. 1) can flow into the filter body 1 upstream of the closure plug 22' by utilizing the flow cross-section of the gas passages 18 and of the passage sections 18". In this area, for example, a catalytic coating can be provided by utilizing the entire flow cross-section. Upstream of the closure plug 22' the exhaust gas is deflected in accordance with arrow 23" through the opening 13 into the gas passage 18 at the intake side. Here it joins the gas flow according to arrow 23 so that the aforementioned filtering function results. In analogy, openings 13 can also be provided upstream of the closure plugs 22 (FIG. 1).

Also, it can be advantageous to provide such openings 13 also in the filter section that is formed by the undulated fiber web 4. A further advantageous possibility resides in that, in addition to the illustrated flow in FIG. 1 in the axial direction 38 and the circumferential direction, also a flow in the radial direction 37 is enabled. In this case, also the filter sections that are formed by the flat fiber web 4' are porous and form filter sections through which flow can pass in the radial direction.

FIG. 3 shows a schematic illustration of a device for producing the filter body 1 (FIG. 1) in accordance with the invention. Two application rollers 30, 31 of the device are arranged axis-parallel to one another and are positioned flush adjacent to one another. They rotated in opposite directions wherein in a wedge-shaped intermediate gap above their contact line a ceramic material 6 is stored. The ceramic material 6 can be a dry powder of finely ground ceramic that is provided for dry impregnation of the fiber web 4. In the illustrated embodiment, an aqueous emulsion 9 is produced from the ceramic material 6. Instead of water also another suitable liquid or a liquid mixture can be expedient. As a ceramic material 6 preferably aluminum oxide, cordierite, mullite, silicon carbide, and/or aluminum titanate can be used alone or in different combinations with one another. A further roller 10 is positioned axis-parallel to the application roller 30 and contacts it along a contact line. The application roller 30 carries as a result of the rotation indicated by the arrow the ceramic emulsion 9 to the roller 10 and rolls the ceramic emulsion 9 onto the surface of the roller 10. By means of roller 10 the ceramic material 6 is rolled into the material of the fiber web 4 that is guided underneath in the direction of arrow 28. For this purpose, the roller 10 is pressed against the fiber web 4. An impregnation of the fiber web 4 with the emulsion 9 is carried out. The planar permeable fiber web 4 absorbs the finely ground ceramic material 6 within its entire cross-section.

The endless fiber web 4 passes subsequently in the direction of arrow 28 through two meshing rollers 20, 20' that are arranged axis-parallel to one another so that an undulated shape is imparted to the fiber web 4 impregnated with the ceramic material 6. The undulations of the undulated rollers 20, 20' are embodied alternatingly with an approximately conical shape so that also the undulations of the fiber web 4 in accordance with the illustration of FIG. 4 are alternatingly conically shaped, i.e., they have in the flow direction a widening or narrowing cross-section. The two undulated rollers 20, 20' are heated. This leads to a slight drying but not complete drying of the undulated fiber web 4 that is impregnated with the emulsion 9 so that the undulated shape is stabilized.

A further fiber web 4' is supplied in the opposite direction in accordance with arrow 27 of the illustrated device and is guided about a pressure roller 29. Relative to the movement direction indicated by the arrow 27 a screen 15 is positioned on the fiber web 4' in front of the pressure roller 29. Above the screen 15 an aqueous emulsion 9 of the ceramic material 6 is stored also. The emulsion 9 is pasted under pressure by means of a doctor blade 11 through the screen into the material of the fiber web 4' so that an impregnation of the fiber web 4' with emulsion 9 is realized. Alternatively, a dry impregnation of the fiber web 4' with ceramic material 6 can be realized also. It can also be expedient to carry out an impregnation of the fiber web 4' with a roller arrangement 10, 30, 31 in accordance with the opposite fiber web 4. Also for the undulated fiber web 4 an impregnation by means of a screen 15 and doctor blade 11 can be expedient.

The pressure roller 29 rests against the lower undulated roller 20. As a result of the opposite rotation of the pressure roller 29 and the undulated roller 20 the flat fiber web 4' and the undulated fiber web 4 are pressed against one another and connected to one another. In the direction of passage behind the roller arrangement 29, 20 the semi-finished product 17 illustrated in detail in FIG. 4 is generated.

FIG. 4 shows an enlarged schematic detail illustration of the semi-finished product 17 according to FIG. 3. The undulated fiber web 4 rests with its wave peaks along the contact lines 19, 19' on the flat fiber web 4' indicated in dashed lines and positioned above and is connected thereto along the contact lines 19, 19'. The connection can be realized by a suitable glue. In the illustrated embodiment the connection is produced by the ceramic emulsion 9 in the fiber webs 4, 4'. It can also be expedient to apply along the contact lines 19, 19' additional ceramic emulsion 9, optionally in thickened form, in order to achieve a connection of the two fiber webs 4, 4'. In the connected state of the semi-finished product 17 the future gas passages 18, 18' are preformed by the undulated structure of the fiber web 4 and the flat shape of the fiber web 4', wherein sidewalls of the undulated fiber web 4 are provided for the formation of the future filter sections 3.

The semi-finished product 17 that is impregnated with the ceramic emulsion 9 is wound in the wet state, i.e., the emulsion is not yet completely dried, into the shape of the future filter body 1 according to FIG. 1 or is stacked instead and subsequently dried. Upon winding or stacking the wave valleys of the undulated fiber web 4 are connected along contact lines 19" with the flat fiber web 4' positioned underneath so that in addition to the gas passages 18 also the further gas passages 18' are closed in radial direction and in circumferential direction of the approximately cylindrical filter body 1 (FIG. 1). The connection at the contact lines 19" is realized in the same way as at the contact lines 19, 19'.

After the drying process the filter blank produced in this way is sintered in a sintering furnace under the action of heat wherein the ceramic material 6 is sintered to a monolithic ceramic body. At the high sintering temperature the material of the fiber webs 4, 4' is burned so that a certain porosity of the ceramic material 6 is achieved. The porosity is designed such that the exhaust gas flow 2 (FIG. 1) passes transversely to the face of the ceramic filter sections 3 through them.

The cross-section of the gas passages 18, 18' changes in the axial direction 38 in that the cross-sections of the intake gas passages 18 narrow from the inlet side 33 to the outlet side 34. In the opposite direction, the cross-sections of the gas passages 18' widen from the inlet side 33 to the outlet side 34 wherein, however, the passage height of all gas passages 18, 18' remains the same. This is achieved by a wave shape of the fiber web 4 with wave peaks that at the inlet side 33 are wide and that are narrow at the outlet side 34. In the illustrated embodiment the width of the wave peaks linearly decreases from the inlet side 33 to the outlet side 34. As a result of the constant passage height and a one-dimensional approximately conical curvature of the fiber web 4 the cross-sectional course is also approximately linear. However, a deviating non-linear course can also be expedient, especially by a multi-dimensional spatial curvature of the fiber web 4. Alternatively, a configuration of the undulations can be advantageous in which the gas passages 18, 18' have a constant cross-section from the inlet side 33 to the outlet side 34.

The exhaust gas flow 2 (FIG. 1) entering along the arrows 23 into the gas passages 18 penetrates along the entire length of the gas passages 18, 18' through the filter sections 3 in accordance with arrows 24. In this way, the volume flow 23 at the inlet side in the gas passage 18 is reduced along the length of the passage while at the outlet side the volume flow 25 in the gas passage 18' will increase along the length of the passage. The afore described cross-sectional course of the gas passages 18, 18' has the result that the flow velocity within gas passages 18, 18' as well as the pressure difference between the gas passages 18, 18' measured across the filter sections 3 is at least approximately constant across the length of the passages. The filtration loading of the filter sections 3 is thus at least approximately constant across the length of the gas passages 18, 18'. With regard to other features and reference numerals, the embodiment according to FIG. 4 is identical to that of FIG. 1.

Figure 5:
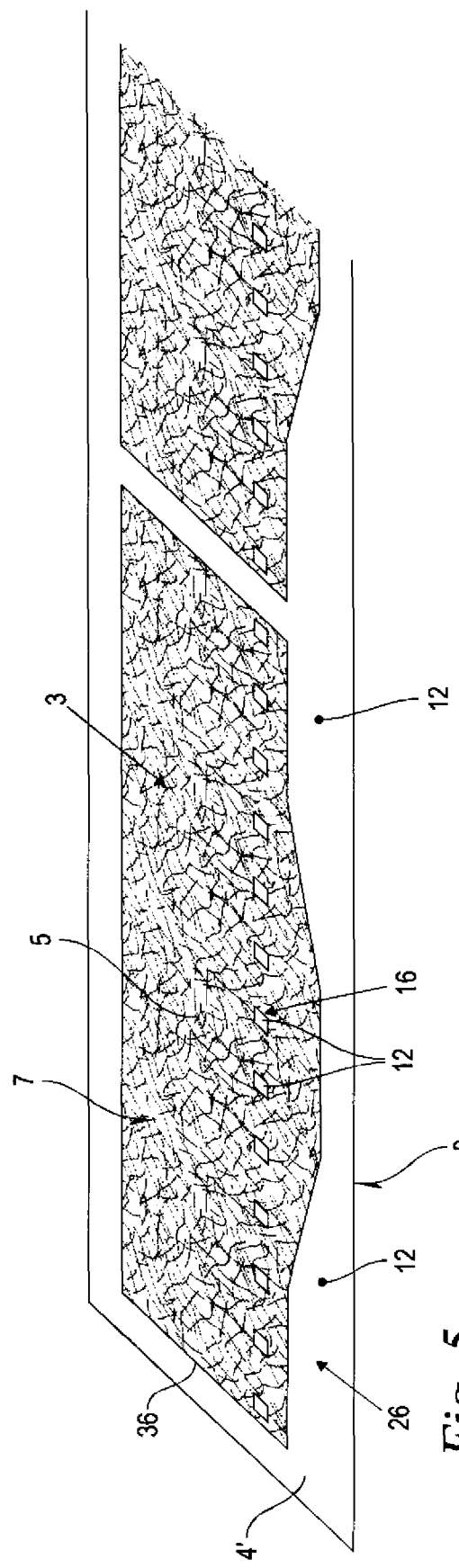
FIG. 5 a schematic perspective illustration of a fiber web that has been impregnated partially by means of the device according to FIG. 3 and is provided with cutouts.

FIG. 5 shows in perspective schematic illustration the endless fiber web 4'. The following disclosure applies also to the other fiber web 4 (FIG. 3). The fiber webs 4, 4', are comprised of fibers 5. Felt, a textile woven fabric or knit fabric can be used. Preferably, an open, permeable filter paper is selected. The fiber web 4' is planar and permeable in the sense that the finely ground ceramic material 6 (FIG. 3) can penetrate into the interstices between the fibers 5 of the fiber web 4. The permeability of the fiber web 4 and the impregnation process according to FIG. 3 are matched relative to one another such that some of the fibers 5 after impregnation with the ceramic material 6 (FIG. 3) are exposed at both opposed faces 7, 8 of the fiber web 4. The fibers 5 are burned off during the sintering process; this causes the sintered ceramic filter section 3 to be porous continuously from face 7 to the opposite face 8 and thus to be gas-permeable for the exhaust gas flow 2 in a direction transverse to the surface of the filter section 3 (FIG. 1).

For certain applications it can be expedient to provide, at least partially, reduced porosity and thus at least approximately a gas-tight section. For example, the filter body 1 (FIG. 1) in the area of the flat fiber web 4' can have such a minimal porosity that, in the filtration process, it is gas-impermeable, technically speaking, while a significant gas permeability is desirable only in the area of the undulated fiber web 4. In this case, in addition to the wet impregnation of the fiber web 4' also closed surface coating with the ceramic material 6 (FIG. 3) on at least one of the two faces 7, 8 is provided without there being exposed fibers 5. In this case, during the sintering process a closed ceramic body is produced that in the area of the faces 7, 8 is hardly porous and thus, in the technical sense, is gas-impermeable. The adjustment of the gas permeability or gas tightness can be produced, or enhanced, by appropriate adjustment of the ceramic material 6.

It can be expedient to impregnate the fiber webs 4, 4' as an untrimmed endless material across its entire surface area with ceramic material 6 (FIG. 3). Non-impregnated sections 12 can be formed, for example, by stamping out cutouts 16 for later formation of openings 13 (FIG. 2) or by trimming a limited planar structure 36 at its edge area 26. In the illustrated embodiment according to FIG. 5 non-impregnated sections 12 are provided that are excluded selectively from impregnation with ceramic material 6. Some of the non-impregnated sections 12 are excluded from impregnation for future formation of openings 13 (FIG. 2). A further non-impregnated section 12 is formed by the edge area 26 that surrounds the planar structure 36. The limited planar structure 36 has a contour that is required for winding the filter body 1 according to FIG. 1. The planar structure 36 can be produced by trimming the fiber web 4 in particular by stamping out the circumferential contour of the planar structure 36 as well as by stamping the cutouts 16. It can also be expedient to eliminate the stamping action for the cutouts 16 and to simply exclude the correlated sections 12 from impregnation with the ceramic material 6 (FIG. 3). This is done in the way described infra. The fiber webs 4, 4' that are impregnated only sectionwise and/or trimmed are joined in the afore described way to the semi-finished product 17 which subsequently is shaped to a blank of the filter body 1 according to FIG. 1. The impregnated areas of the fiber webs 4, 4' assume the shape of the filter body 1 (FIGS. 1 and 2). During the subsequent sintering process, the sections 12 that are not trimmed and not impregnated are burned completely and leave behind the filter body 1 in its shape predetermined in accordance with FIG. 1, including the openings 13 (FIG. 2).

The illustration according to FIG. 3 shows that the roller 10 has a surface structuring 14. The latter corresponds in its shape to the contour of the flat planar structure 36 according to FIG. 4. The ceramic emulsion 9 is rolled only by means of the projecting surfaces of the surface structuring 14 under pressure into the fiber web 4. In intermediately positioned areas of the surface structuring 14 that are recessed in the radial direction no impregnation with the ceramic material 6 can occur so that the fiber web 4 in analogy to the fiber web 4' according to FIG. 5 is impregnated with the ceramic material 6 only partially and with formation of non-impregnated sections 12.

An alternative modification of the manufacturing process of non-impregnated sections 12 in the fiber web 4' can be taken from the illustration according to FIG. 3 in the area of the screen 15. The screen 15, similar to screen printing methods, is provided with schematically indicated covers 35. The covers 35 correspond in their contour to the shape of the non-impregnated sections 12 according to FIG. 5. Upon applying the ceramic emulsion 9 under pressure by means of the doctor blade 11 the covers 35 partially prevent, optionally also the stamped-out portions or cutouts 16 (FIG. 5), an impregnation and form the non-impregnated sections 12.

The illustration according to FIG. 3 also shows that before joining the two fiber webs 4, 4' beads 21 of ceramic material are applied onto the undulated fiber web 4 in accordance with arrow 32. The ceramic beads 21 are squeezed between the two fiber webs 4, 4' and form later on the closure plugs 22, 22' according to FIG. 1. For the alternating arrangement of the closure plugs 22, 22' according to FIG. 1 it can be expedient to apply the beads 21 in an uninterrupted fashion. For certain applications it can also be expedient to arrange the closure plugs 22, 22' in the circumferential direction in a continuous fashion wherein then the correlated beads 21 are also applied continuously. The beads 21 are comprised of a wet soft ceramic material and are dried together with the fiber webs 4, 4' and subsequently sintered so that a monolithic ceramic filter body 1 according to FIG. 1 is produced.

In the illustrated embodiment first an impregnation of the fiber webs 4, 4' with the ceramic material 6 (FIG. 3) and subsequently the shaping to the undulated structure of the fiber web 4, joining to the semi-finished product 17, and winding to the blank of the filter body 1 according to FIG. 1 are carried out. This blank is subsequently dried and finally sintered. It can also be expedient to first trim and shape the blank of the filter body 1 according to FIG. 1 from non-impregnated fiber webs 4, 4' in the aforementioned way and only then, for example, by means of an immersion bath, to impregnate it with the ceramic material 6 (FIG. 3). Subsequently, the drying process and finally the sintering process are carried out.

The invention claimed is:

1. Method for producing a ceramic filter body (1) for filtering an exhaust gas stream (2) of a diesel engine, wherein the filter body (1) has planar and porous filter sections (3) that are designed for flow-through of the exhaust gas stream (2) in a direction transverse to the face of the filter sections (3), comprising the following method steps:
   a planar permeable fiber web (4, 4') of filter paper is first impregnated with finely ground ceramic material (6) under formation of at least one non-impregnated section (12);
   wherein a first fiber web (4) of said planar permeable fiber web (4, 4') is formed into an undulated structure and a second fiber web (4') is produced to be flat;
   wherein at least one individual section (12) of the fiber web is excluded from impregnation for later formation of an opening (13) in the filter body (1);
   the only partially ceramic-impregnated fiber web (4,4') is subsequently brought into the shape of a blank of the filter body (1) in such a way that the impregnated areas of the fiber web (4, 4') assume the shape of the filter body (1);
   wherein said first and second fiber webs (4, 4') are connected to one another along several contact lines (19) at wave peaks of the undulated structure by an adhesive or by said ceramic material (6);
   wherein said connected two fiber webs (4, 4') form gas passages (18) therebetween;
   the fiber web (4, 4') impregnated with the ceramic material (6) and shaped is subsequently sintered under heat in such a way that the fibers (5) of the fiber web are burned off and the ceramic material (6) is sintered under formation of the filter body (1) with filter sections (3) that are continuously porous and gas-permeable between their two faces (7, 8);
   wherein said at least one individual section (12) of permeable fiber web (4, 4') lacking any impregnation is removed from said filter body by burning off said at least one individual section in said sintering, said at least one burned off individual section forming an opening (13) in the filter body (1), said opening interconnecting two of said gas passages.

2. Method according to claim 1, characterized in that the impregnation is realized under the action of pressure by means of a roller (10) or a doctor blade (11).

3. Method according to claim 2, characterized in that the formation of the non-impregnated section (12) is realized by partial impregnation by means of a roller (10) having a surface structuring (14).

4. Method according to claim 2, characterized in that the formation of the non-impregnated section (12) is realized by partial impregnation by means of a partially covered screen (15) between the fiber web (4) and the doctor blade (11).

5. Method according to claim 1, characterized in that for formation of the non-impregnated section (12), of the opening (13), a cutout (16, 16') is introduced into the fiber web (4) or the fiber web (4) is trimmed.

6. Method according to claim 1, characterized in that the planar permeable fiber web (4) is impregnated with the ceramic material (6) such that a part of the fibers (5) of the fiber web (4) is exposed at both faces (7, 8).

7. Method according to claim 1, characterized in that
   at least one fiber web (4) is three-dimensionally shaped between two neighboring contact lines (19, 19');
   wherein the ceramic-impregnated fiber web is in a wet state when brought into the shape of the filter body;
   wherein before shaping said filter body, partially drying the ceramic impregnated undulated fiber web by means of a heated undulated roller (20, 20'), said partial drying of said ceramic impregnation stabilizing the three-dimensional shape of said ceramic impregnated undulated fiber web layer.

8. Method according to claim 1, characterized in that between two neighboring fiber webs (4, 4') at least one bead (21) of ceramic material is applied for formation of closure plugs (22, 22') for the gas passages (18, 18').

9. Method according to claim 1, characterized in that the semi-finished product (17) is shaped in the wet state in the form of the blank of the filter body (1), by winding or stacking, is subsequently dried, and finally sintered.

10. A method for producing a ceramic filter body (1) for filtering an exhaust gas stream (2) of a diesel engine, wherein the filter body (1) has porous filter sections (3) that are designed for flow-through of the exhaust gas stream (2) in a direction transverse to a face of the filter sections (3), comprising the following method steps:
    impregnating at least two sheets of planar permeable fiber web (4, 4') with finely ground ceramic material (6) while including formation of at least one non-impregnated fiber web section (12) forming a partially ceramic-impregnated fiber web;
    imparting a three-dimensional undulated structure into a first fiber web (4) of said planar permeable fiber web (4, 4') by passing said ceramic impregnated first fiber web (4) between meshing undulated rollers while said first fiber web is in a wet state;
    partially drying said ceramic impregnated undulated fiber web by means of a heated one of said undulated rollers, said partial drying of said ceramic impregnation stabilizing a three-dimensional shape of said ceramic impregnated undulated fiber web layer;
    shaping the only partially ceramic-impregnated fiber web (4,4') into the shape of a blank of the filter body (1) in such a way that the impregnated areas of the fiber web (4, 4') assume the shape of the filter body (1);
    sintering under heat the shaped filter body blank with fiber web (4, 4') impregnated with the ceramic material (6) so as to dry and start to burn off said fiber web; and
    continuing to sinter the ceramic material (6) of the filter body blank to realize said stable ceramic filter body with filter sections (3) that are continuously porous and gas-permeable between their two faces (7, 8);
    wherein in the sintering and continuing steps, said at least one individual section (12) of the fiber web (4) excluded from impregnation is burned off forming an opening (13) in the filter body (1), said opening interconnecting two gas passages in said filter body;
    wherein in the impregnating step, said sheets of planar fiber web comprise filter paper; and wherein said shaping step includes winding or stacking said sheets in an at least partially wet state to form said filter body blank.

11. The method according to claim 10 wherein
in the impregnating step the impregnation is realized under the action of pressure in particular by means of a roller (10) or a doctor blade (11); and
wherein in the impregnating step the formation of the non-impregnated section (12) is realized by partial impregnation by means of a roller (10) having a surface structuring (14).

12. The method according to claim 11 wherein in the impregnating step, the formation of the non-impregnated section (12) is realized by partial impregnation by means of a partially covered screen (15) between the fiber web (4) and the doctor blade (11).

13. The method according to claim 10 wherein prior to said impregnating step, the method further comprises:
connecting said filter webs (4,4') to one another along contact lines (19) to form a semi-finished product (17) with gas passages (18), wherein at least one fiber web (4) is three-dimensionally shaped between two neighboring contact lines (19, 19').

14. The method according to claim 13 wherein in said connecting step the first fiber web (4) is produced with an undulated structure and the second fiber web (4') is produced to be flat, wherein the two fiber webs (4, 4') for formation of the gas passages (18) are connected to one another at wave peaks of the undulated structure.

* * * * *